April 10, 1956

G. C. DEVOL ET AL 2,741,757

MAGNETIC STORAGE AND SENSING DEVICE

Filed May 12, 1950

INVENTOR.
GEORGE C. DEVOL
AND
ERIK B. HANSELL

BY John L Sterling

ATTORNEY

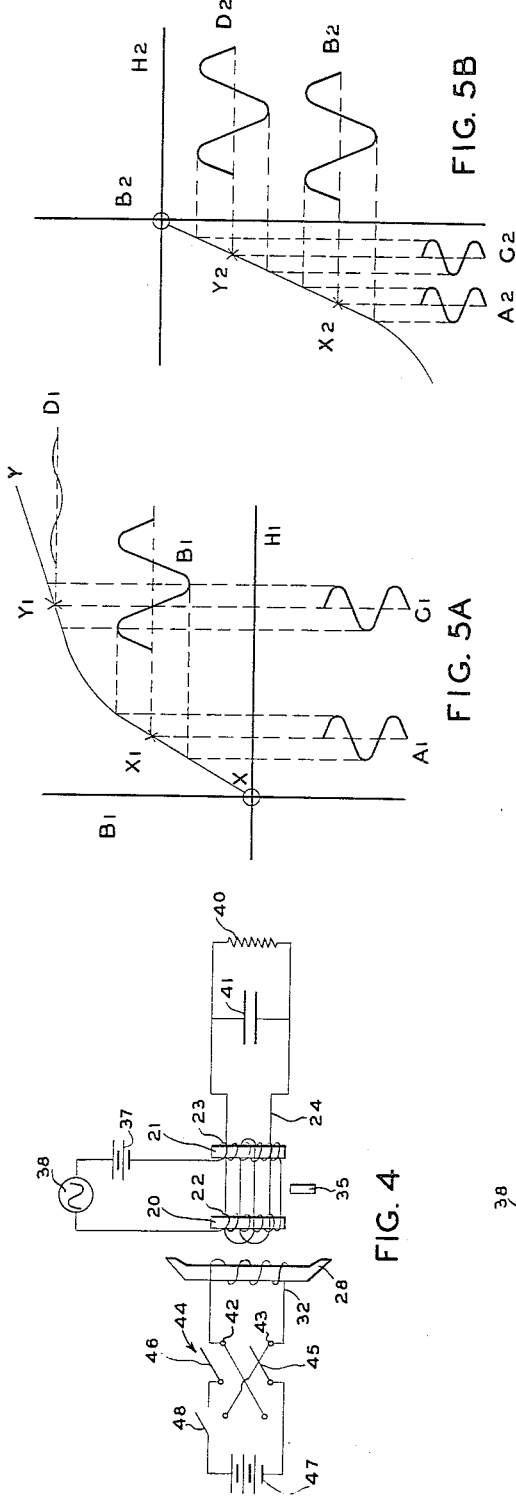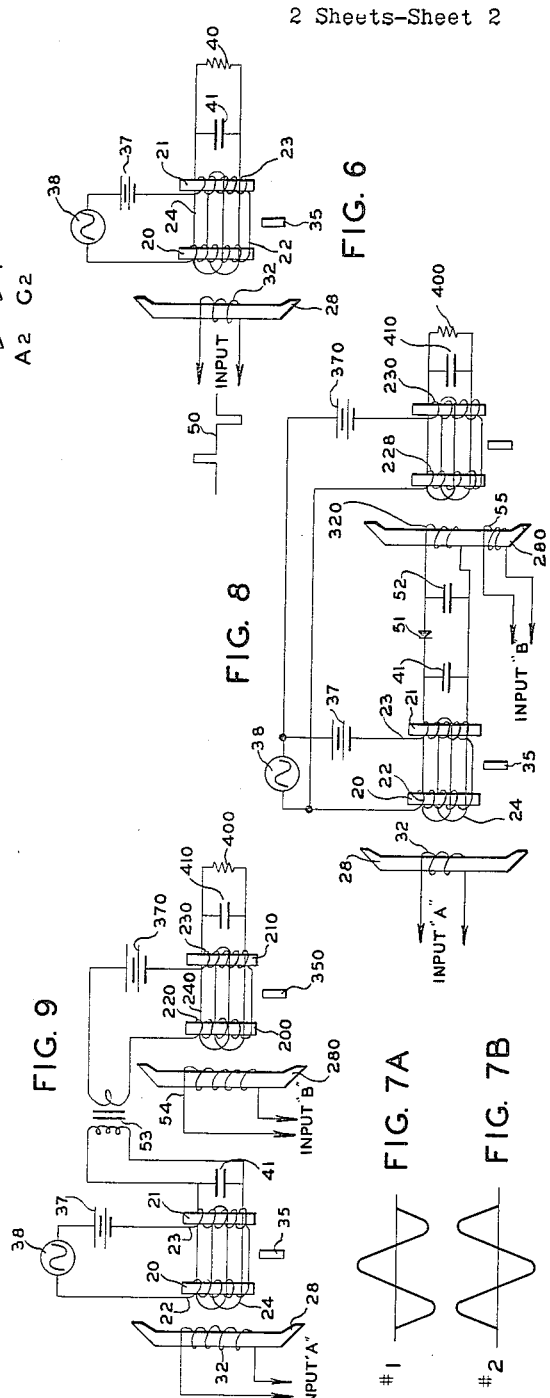

United States Patent Office 2,741,757
Patented Apr. 10, 1956

2,741,757

MAGNETIC STORAGE AND SENSING DEVICE

George C. Devol, Greenwich, and Erik B. Hansell, East Hartford, Conn., assignors, by mesne assignments, to said Devol Application May 12, 1950, Serial No. 161,702

12 Claims. (Cl. 340—174)

This invention relates to improvements in electrical circuits controlled by magnetic fields, and their adaptation to storage of information.

In many arts it is desired to produce a large change in one electrical circuit by a small change in another circuit. This can be done by electronic and gas discharge devices. Such devices have high sensitivity or gain and are responsive to very rapid changes in the control circuit. However, such a device is sensitive to shock and vibration and is fragile and of limited current carrying capacity. The saturable core reaction type of magnetic amplifier was developed to provide a rugged high power controlling device as disclosed in a series of patents beginning with 1,206,643, issued to Ernest F. W. Alexanderson in 1916. These devices do not have the sensitivity and speed of response of the electronic amplifier.

An object of the invention is to provide a magnetically controlled electrical device having high sensitivity and speed of response.

A further object is to affect the balance of a balanced transformer by introducing a magnetic field to unbalance the transformer and permit a signal to be induced in the output circuit.

A further object is to provide a balanced transformer with magnetic control means having the ability to remember the fast control impulse received even after an interval without exciting voltage.

A further object is to produce this magnetic field by means of a coil wound about a permanent magnet and connected in a circuit producing a signal voltage.

A further object is to produce this magnetic field by means of a coil wound about a permeable metal core and connected in a circuit having a control current.

A further object is to produce a cascade arrangement of such transformers the output circuit of the first such transformer including the input winding of the second transformer.

A further object is to produce a cascade arrangement of such transformers, the first stage being controlled by the controlling magnet and its output fed to the primary of the second transformer, the output of which is also controlled by an associated electromagnet.

A further object is to provide a balanced transformer with two or more controlling magnets controlled by separate circuits.

Still another object is to provide a balanced transformer with controlling magnet with its core placed in series with the source of controlling current.

To obtain these objects the various embodiments illustrating the several aspects and features of the invention described more fully below have adapted magnetometers of a type similar to those disclosed in Vacquier's Patent 2,406,870 for use as a control device. This is accomplished by adding to the basic coil and core arrangement of Vacquier two or more magnets, one or more of which may have a coil wound on it connected to the controlling circuit. A second magnet may be positioned mechanically in the field of the magnetometer to initially either balance or bias it. Additional control magnets may be added as needed.

Two such control devices may be connected in tandem. The output of the first is rectified and fed to the control coil of the second.

A more complete understanding of the construction and operation of the invention may be obtained from the following specification when read in conjunction with the drawing, in which Fig. 1 is a vertical view, partly in section taken through a preferred form of a magnetic control unit;

Fig. 4 is a schematic diagram of a switch controlled version of the magnetic control device illustrating the principle of operation;

Fig. 5A is a graph of the B–H function of one core of the device in Figs. 1 to 4 showing the input and output of different bias points;

Fig. 5B is a similar graph for the other core of the device in Figs. 1 to 4;

Fig. 6 is a schematic diagram of a pulse controlled version of the magnetic control device;

Fig. 7A is a graph of the output of the device shown in Fig. 4 with one setting of the reversing switch;

Fig. 7B is a graph of the output of the device shown in Fig. 4 with the other setting of the reversing switch;

Fig. 8 is a schematic diagram of one form of cascaded control devices;

Fig. 9 is a schematic diagram of another form of cascaded control devices;

Figure 1:
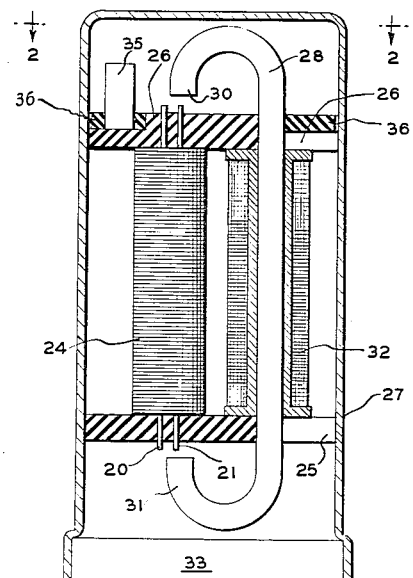

Referring to the drawings in detail and in particular to Fig. 1, in a preferred embodiment of the control device, a pair of parallel transformer cores 20 and 21 is provided each wound with a respective coil 22 and 23 and both wound with a third coil 24. The cores 20 and 21 are rigidly mounted in discs 25 and 26 of insulating material which are in turn mounted in a metal envelope 27 such as the metal envelope of a vacuum tube of receiver type. The discs 25 and 26 also support a C shaped piece of magnetic material 28, wound with a coil 32 and having its ends 30 and 31 aligned with the ends of the core 21. Leads are brought out from the coils 22, 23, 24 and 32 through the seal 33 by pins 34 in the manner used in vacuum tube construction. A small permanent magnet 35 is mounted in a ring of insulating material 36 set in a recess in the disc 26 and adjusted, before sealing, to properly bias and align the magnetic fields of the cores 20, 21 and 30.

This device may be used in a circuit such as that shown in Fig. 4 to illustrate the principle of operation. The cores 20 and 21 with their respective coils 22 and 23 are so wound and connected as to produce fluxes in opposition so that, when connected in series with a battery 37 and a source of cyclically varying current 38, no voltage will be induced in the secondary winding 24 connected to the load circuit 40 across the capacity 41. The permanent magnet 35 may be adjusted in position to achieve this effect or to give a biasing flux to produce an output in the absence of a signal, thus acting as a bias. The C-shaped core 28 can be a permanent magnet wound with a coil 32 connected across the outer terminals 42 and 43 of a double pole double throw reversing switch 44. In this case the effect of the control current is to either increase this magnetic flux or counteract it.

The core 28, of magnetically retentive material, may be used to produce a storage effect in which the conditions for producing a certain output, once set up by a signal, are retained after the signal and exciting current have stopped for an interval. The arms 45 and 46 of the reversing switch are connected across a source of D. C. voltage 47 with a single pole, single throw switch 48 in one side of the circuit. With switches 44 and 48 closed, voltage is applied across the winding 32 to produce a flux in the core 28 either aiding or opposing its magnetism. The basic curve XY, in Fig. 5A represents the B–H curve of the core 20 and coil 22. The points $X^1$ and $Y^1$, represent different bias points. This bias is the magnetic bias in core 20, produced largely by the direct current from battery 37 in coil 22. The sine waves $A^1$ and $C^1$ represent a possible cyclically varying voltage supplied by the generator 38. It will be noted that the B–H curve has a sharp knee in it between the points $X^1$ and $Y^1$, which is characteristic of the material of which the cores 20 and 21 are made. When the initial bias is set at point $X^1$, and cyclically varying voltage $A^1$ is fed to the coil 22 an output voltage $B^1$ appears across the secondary coil 24. When the bias is changed to a point $Y^1$ past the knee of the B–H curve and the same cyclically varying voltage $C^1$ is applied, a voltage $D^1$ is obtained across the secondary coil 24 that is considerably smaller. This change is effected, for example, by closing switches 44 and 48, thereby to change the resultant magnetic bias in core 20. Fig. 5B shows a similar curve for core 21 and coil 23 except that the B–H curve appears in the third quadrant because of the way the coil 23 is wound. Points $X^2$ and $Y^2$ are shown below the knee. Point $X^2$ is the initial magnetic bias in core 21 corresponding to point $X^1$ in Fig. 5A, produced largely by the direct current in coil 23. Point $Y^2$ is the magnetic bias in core 21 corresponding to point $Y^1$ in Fig. 5A, produced for example when switches 44 and 48 are closed for shifting the bias in core 20 from $X^1$ to $Y^1$. The point $Y^2$ is closer to the origin than point $X^2$ because, to the extent that changed flux from core 28 may thread through core 21, it opposes the initial bias. In the example considered, point $Y^1$ shows that core 20 is subjected to a magnetic increment from core 28. The same change in core 28 produces a decreased magnetic flux in core 21 since the sense of coil 22 is opposite that of coil 23. As with coil 22, the cyclically varying voltage $A^2$ applied to coil 23 produces an output voltage $B^2$, and a cyclically varying voltage $C^2$ when applied to coil 23 biased to point $Y^2$, produces an output voltage $D^2$ across the secondary coil 24.

When the magnetic flux flows equally in both cores 20 and 21 and in opposing directions, no voltage is induced in coil 24. When either magnet 35 or the magnetism in core 28 is such as to permit more flux to flow through core 20 than core 21, or vice versa, a voltage will be induced in the coil 24 of a phase dependent upon which core 20 or 21 is carrying the greater flux, that is, dependent upon which core has been biased beyond the knee of its B–H curve. When core 28 is initially magnetized a current of a certain phase will be produced in the secondary coil 24. When the switches 44 and 48 are closed, the magnetism of core 28 may be neutralized in whole or in part or increased to reverse the phase of or reduce or increase the voltage induced in the secondary winding 24 according to the polarity and magnitude of the voltage of the source 47. If the core 28 has high retentivity the D. C. voltage source 47 and the switches 44 and 48 may be eliminated and a source of positive or negative pulses or of square waves may be substituted as shown in Fig. 6 where the source of pulses 50 is substituted for the D. C. source 47 and switches 44 and 48. With this arrangement the permanent magnet 35 may be positioned either to cause a voltage to be induced in the secondary 24 when there is no pulse in the winding 32 or to produce an unbalance in the flux paths and hence a voltage in the secondary 24 under these conditions. In this case the permanent magnet 35 may be said to act as a bias. The magnet 35 does not need to be magnetized to have this effect and need only be of magnetic material. However, the effect will be considerably greater if it is magnetized.

Fig. 7A shows a graph of the output of the device shown in Fig. 4 with one setting of the reversing switch or of the device shown in Fig. 6 with a positive pulse, for instance, applied to the coil 32. In Fig. 7B it is shown that the reversal of the switch in the circuit of Fig. 4, or the presence of a negative pulse across the coil 32, will have the effect of reversing the phase of the output.

Two or more of the devices shown in Fig. 6 can be cascaded in either the circuit shown in Fig. 8 or in the circuit shown in Fig. 9.

In the circuit shown in Fig. 8 the output of the secondary winding 24 of the first stage is connected through a rectifier 51 to a control winding 320 on the control core of the second stage. There may be an additional control winding to give a coincidence effect. The source of cyclically varying exciting current is common to the coils 22 and 23 of the first stage and 228 and 230 of the second stage. There is an additional capacitor 52 connected across the control winding 320 of the second stage with the rectifier connected in series in the high side of the line between the two capacitors. The oscillating winding of each stage has a separate D. C. supply 37, 370 so that its bias point may be separately adjusted.

In the circuit of Fig. 9 the output of the first stage is coupled through a transformer 53 to the exciting windings 220 and 230 of the second stage. Again the bias supplies 37 and 370 for the exciting windings of the stages are independent. There may be a winding 54 on the control core 280 of the second stage connected to a second control circuit for coincidence effects or the control core may be a permanent magnet to give bias.

Figure 10:
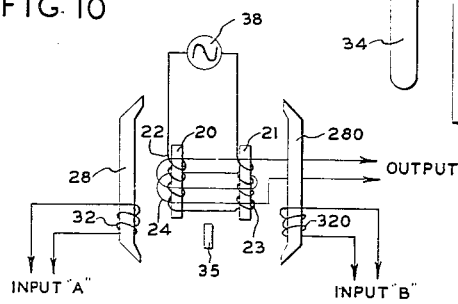
Fig. 10 is a schematic diagram of a modification of the device shown in Fig. 6 having two control magnets.

It has been found convenient as shown in Fig. 8 to place two control windings 320 and 55 on a single control core 280, or as shown in Fig. 10 to mount a plurality of control cores 28 and 280 magnetized or unmagnetized with one or more control windings 32 and 320 on each.

Figure 11:
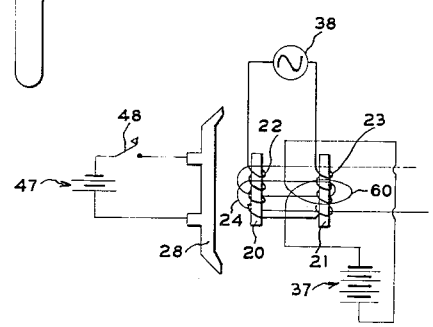
Fig. 11 is a schematic diagram of a modification of the device shown in Fig. 6 in which the control magnet core is connected in series with the control current source.
Figure 2:
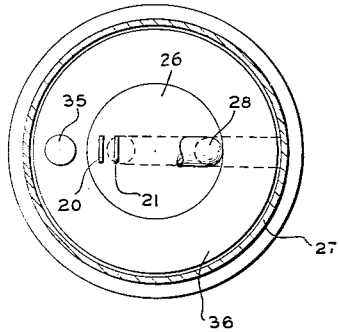
Fig. 2 is a horizontal section along the line 2—2 of Fig. 1 of the magnetic control unit.
Figure 3:
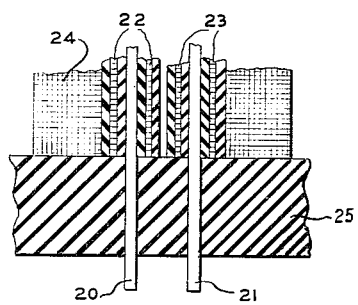
Fig. 3 is an enlarged section of a portion of transformer cores showing the mounting and coil windings thereof.

When relatively heavy currents are available for control purposes as in the embodiment of Fig. 8 the current may be fed directly through the core 28 as shown in Fig. 11 to magnetize it with a polarity depending upon the direction of the current. The flux will flow through the core in the same direction as the current used to create it. This form of magnetization of the control element is of special value because of the increased speed of operation that is possible when it is used.

It is of course possible to apply the D. C. bias by means of a separate winding 60 as shown in Fig. 11 instead of in series with the exciting source 38 to permit greater flexibility in adjustment.

While I have described what we consider to be highly desirable embodiments of our invention, it is obvious that many changes in form could be made without departing from the spirit of my invention, and we, therefore, do not limit ourselves to the exact forms herein shown and described, nor to anything less than the whole of our invention as hereinbefore set forth, and as hereinafter claimed.

What we claim as new, and desire to secure by Letters Patent, is:

1. A unitary information storage assembly, comprising a magnetic member exhibiting residual magnetism, control means fixed in assembly to said member for impressing magneto-motive forces thereon and effective to change its magnetic state, and transducing means including a core magnetically coupled to said member through an air gap and mounted in fixed assembly with said member and with said control means, said transducing means producing signals representing the retained magnetic state of said member impressed by said control means, and said member retaining said magnetic state during and after operation of said transducing means.

2. A unitary information storage assembly, according to claim 1, wherein said transducing means comprises a saturable-core magnetometer.

3. A unitary information storage assembly according to claim 2, including additionally a permanent magnet fixed in adjusted position relative to said magnetometer.

4. A unitary information assembly according to claim 1, including a pair of closely adjacent parallel-extending saturable core portions and means biasing said core portions oppositely toward saturation.

5. A unitary information storage assembly according to claim 1, wherein said control means comprises electrical connections to said magnetic member for passing magnetizing current therethrough.

6. Apparatus according to claim 1, including alternating current input and output circuits and wherein said transducing means includes coils in said circuits, respectively, said coils being balanced in the absence of directional magnetic fields, and wherein said magnetic member is disposed in relation to said core of said transducing means to unbalance said coils.

7. The unitary information storage device of claim 1, wherein said transducing means embodies a pair of cores having polarized bias means effective to bias both cores part way toward saturation, and having opposite bias-induced poles adjacent each other and said poles being adjacent a pole of said magnetic member, whereby magnetization of said member in one polarity will shift one of said cores toward saturation and will shift the other of said cores further away from saturation.

8. A unitary information assembly according to claim 1, said transducing means including a pair of saturable core portions, each core portion having a pole closely adjacent a pole of the other and said poles being closely adjacent a pole of said magnetic member but spaced from said member by said air gap and said cores having means producing oppositely polarized bias therein, said transducing means further including respective exciting and output windings about said core portions producing signals representing the magnetization and polarity of magnetization of said magnetic member when magnetized.

9. A unitary information storage assembly, including a magnetic member of magnetically retentive material, control means fixed in assembly to said member for impressing magneto-motive force thereon and effective to change its sustained magnetic state, and transducing means including a pair of cores magnetically coupled to said member through respective air gaps and mounted in fixed assembly with said member and with said control means, said cores having input and output windings thereon with portions of the windings extending from each core to the other and wound in a sense and proportion to produce mutually canceling induced output from the output winding portions in response to excitation of the input winding, in the absence of unequal magnetization in said cores, means biasing said cores only partway toward saturation, the bias polarities in said cores being opposite each other at said air gaps so that each polarity of magnetization in said member shifts one of said cores toward saturation and the other of said cores away from saturation, said transducing means producing signals representing the retained magnetic state of said member impressed by said control means, and the phase of the induced output resulting from one polarization of said member being the reverse of the phase of induced output resulting from the opposite polarization thereof, and said member retaining said magnetic state during and after operation of said transducing means.

10. A unitary information storage assembly, comprising a magnetic member of magnetically retentive material, control means fixed in assembly to said member for impressing magneto-motive force thereon and effective to change its retained magnetic state, and transducing means including a saturable core magnetically coupled to said member through an air gap and mounted in fixed assembly with said member and with said control means, a pair of windings on said core, a first one of which windings is adapted to be excited and the second one of which windings is thereupon effective to respond with induced output whose magnitude diminishes with increasing saturation of said core, said transducing means producing signals representing the retained magnetic state of said member impressed by said control means, and said member retaining said magnetic state during and after excitation of said first winding.

11. The unitary information storage assembly in accordance with claim 10, in combination with a second core provided with input and output winding portions thereon extending from the corresponding windings on the first-mentioned core, said winding portions being so related to each other and to the windings on the first core from which they extend that the output is balanced in the absence of unbalanced saturation in said cores.

12. Apparatus in accordance with claim 11, wherein said second core is disposed with a pole thereof adjacent said air gap and said cores having biasing means polarizing the cores oppositely at said air gap.

References Cited in the file of this patent

UNITED STATES PATENTS

| | | |
|---|---|---|
| 2,339,406 | Holden | Jan. 18, 1944 |
| 2,406,870 | Vacquier | Sept. 3, 1946 |
| 2,519,426 | Grant | Aug. 22, 1950 |
| 2,524,154 | Wood | Oct. 3, 1950 |
| 2,608,621 | Peterson | Aug. 26, 1952 |
| 2,614,167 | Kamm | Oct. 14, 1952 |
| 2,649,568 | Felch et al. | Aug. 18, 1953 |

OTHER REFERENCES

Reviews of Modern Physics. American Physical Society, January 1947, pp. 78–82.

Proceedings of the I. R. E., June 1950, pp. 626–629.